United States Patent
Monji et al.

[11] Patent Number: 5,087,279
[45] Date of Patent: Feb. 11, 1992

[54] METHOD OF PRODUCING OPTICAL GLASS ELEMENT AND PRODUCTION APPARATUS USING THIS METHOD

[75] Inventors: Hideto Monji, Osaka; Kiyoshi Kuribayashi, Neyagawa; Masaaki Sunohara, Nishinomiya; Tadayoshi Yonemoto, Moriguchi; Noriyuki Kawata, Omiya; Tadao Shioyama, Sakurai; Makoto Umetani, Osaka, all of Japan

[73] Assignees: Matsushita Electric Industrial Co., Ltd., Osaka; Sumita Optical Glass, Inc., Tokyo, both of Japan

[21] Appl. No.: 549,437

[22] Filed: Jul. 6, 1990

[30] Foreign Application Priority Data

Jul. 14, 1989 [JP] Japan ................. 1-182955
Jul. 26, 1989 [JP] Japan ................. 1-195061
Oct. 27, 1989 [JP] Japan ................. 1-280976

[51] Int. Cl.$^5$ ............................. C03B 11/00
[52] U.S. Cl. ............................. 65/64; 65/32.1; 65/77
[58] Field of Search ........... 65/32.1, 37, 66, 77, 65/72, 83, 64

[56] References Cited

U.S. PATENT DOCUMENTS

3,278,285 10/1966 Pickering ................. 65/77 X
3,900,328 8/1975 Parsons et al. ............. 65/68 X
4,139,677 2/1979 Blair et al. .
4,168,961 9/1979 Blair ........................ 65/66
4,915,720 4/1990 Hirota et al. .............. 65/64

FOREIGN PATENT DOCUMENTS

54-60312 5/1979 Japan .
54-39846 11/1979 Japan .
59-116137 7/1984 Japan .
61-146721 7/1986 Japan .
64-24024 1/1989 Japan .
64-52619 2/1989 Japan .

*Primary Examiner*—Robert L. Lindsay
*Attorney, Agent, or Firm*—Stevens, Davis, Miller & Mosher

[57] ABSTRACT

A method and apparatus are provided for producing an optical glass element, including displacing a gob of optical glass on a first heat working jig to a second heat working jig by making the gob of optical glass adhere to the second heat working jig due to a difference in wettability with high temperature glass between the first heat working jig and the second heat working jig. The gob of optical glass on the second heat working jig is thermally deformed to form an optical glass preform. The optical glass preform is formed under heat and pressure by using pressure molds to form an optical glass element.

13 Claims, 5 Drawing Sheets

METHOD OF PRODUCING OPTICAL GLASS ELEMENT AND PRODUCTION APPARATUS USING THIS METHOD

BACKGROUND OF THE INVENTION

1. Field of the Invention

The present invention relates to a method of producing a high precision optical glass element such as a lens, a prism or the like and a preform of the optical glass element used for reheat press forming, and to an apparatus for producing the optical glass element.

2. Description of the Prior Art

In recent years, optical glass lenses have a tendency to be formed into an aspheric shape which permits both the simplification of the lens structure and the minimization in weight of the lens portion. In the production of such aspheric lenses, since they cannot be easily worked and mass-produced by a grinding method, which is a conventional method of producing optical lenses, a forming method using a mold is considered to be promising (refer to U.S. Pat. Nos. 3,900,328, 4,139,677 and 4,168,961). This forming method using a mould is a method in which a polished optical glass is formed by heating on an aspheric mould which is finished to a surface with desired surface quality and surface accuracy or a gob of molten optical glass is formed by heating.

When optical glass elements such as aspheric lenses, prisms and the like are produced by reheat press moulding, it is necessary to use optical glass preforms having surfaces without any pit such as fine irregularity or flaws (for example, in a mirror surface having surface roughness of 0.005 $\mu$ or less by RMS). Conventional preforms of optical glass are formed by receiving molten glass in a mould or by working molten glass and then polish it (refer to U.S. Pat. No. 4,139,677 and Japanese Patent Unexamined Publication No. 59-116137). The method of working molten glass and then polish it requires many complicated processes and is thus expensive. A method of working high temperature glass by using a glass former such as a shaping pan, a mould or the like, which is coated with a parting agent carbon layer by gas phase reaction, is proposed as the method of receiving molten glass (refer to, for example, Japanese Patent Unexamined Publication No. 54-60312). Since the parting agent carbon layer formed in this method comprises a porous heterogeneous film, there are problems in that the parting agent adheres as a foreign substance to the glass surface, a mirror surface with surface roughness of 0.005 $\mu$ or less by RMS cannot be obtained, fine irregularity occurs in the glass surface, and the life of the mould used is reduced owing to the oxidative wear of the carbon layer. In a method proposed for removing pits from the glass surface, the thickness as the center of the original glass form having a central thickness which is greater than that of the preform is reduced by softening by heating on a support plate made of a fireproofing material such as graphite, mullite or cordierite (refer to, for example, Japanese Patent Unexamined Publication No. 64-52619). Since the fireproofing support plate used in this method is made of a porous material and has fine irregularity, the fine irregularity is transferred to the contact surface of the preform from the fireproofing support plate, or blow holes are produced. No optical mirror surface can be thus obtained, and the preform is subjected to after-working (such as polishing) for removing fine irregularities after the production of the preform.

SUMMARY OF THE INVENTION

It is an object of the present invention to provide a method and an apparatus for producing a high accuracy optical glass element such as a lens, a prism or the like, and producing a preform of the optical glass element used for reheat press moulding.

In order to achieve this object, the present invention provides a method of producing an optical glass element comprsiing the steps of making a gob or a chunk of optical glass placed on a first heat working jig to adhere to a second heat working jig so as to displace the gob to the second heat working jig in an oxygen free atmosphere, thermally deforming the gob of optical glass by the second heat working jig to produce an optical glass preform and forming the optical glass preform under heating and pressure by means of pressing moulds to produce an optical glass element.

The gob of optical glass on the first heat working jig can be displaced to the second heat working jig by making the gob to adhere to the second heat working jig without holding by any other jig. The displacement of the gob of optical glass from the first heat working jig to the second heat working jig makes use of the difference in wettability with high temperature glass between the two heat working jigs. Namely, it is recommended to form the first heat working jig by using a material having a low level of wettability with molten glass. Examples of such materials, that may be used, include carbon, graphite, glassy carbon, boron nitride, stainless steels, nickel-base alloys and the like. The second heat working jig is preferably formed by using a material which is chemically stable, does not react with glass and is relatively easily wetted with glass. Examples of such materials single metals such as noble metals, tungsten, tantalum, rhenium, hafnium and alloys thereof.

When the gob of optical glass displaced from the first heat working jig to the second heat working jig by the above-described method is heated on the second heat working jig, the surface which contacts with the optical surface of the second heat working jig is slowly deformed, with the optical surface of the second heat working jig being correctly transferred. While the other surface which does not contact with the optical surface of the heat working jig forms a free surface by virtue of the surface tension of glass. Such thermal deformation of optical glass permits the production of an optical glass preform having the transfer surface of the optical surface of the heat working jig and the free surface. An optical glass element of high surface quality and high surface accuracy can be produced by forming the optical glass preform under heating and pressure using pressing moulds each having a high accuracy shape and optical surface.

The pressing moulds used may be coated with a chemically stable thin film and have a high accuracy shape and optical surface. The chemically stable thin film is preferably formed by using a single metal such as noble metals, tungsten, tantalum, rhenium or hafnium or an alloy thereof. The thin film which is coated on each of the heat working jig and the pressing moulds and which is made of a single metal such as noble metals, tungsten, tantalum, rhenium or hafnium or an alloy thereof, does not react with and adhere to optical glass in an oxygen free atmosphere.

The use of any of such materials permits the formation of homogeneous, dense and strong thin films on the heat working jig and the pressing moulds by a sputtering process, ion plating process or plating process.

As a result, the thin films are not separated, and a mirror surface having surface roughness of 0.005 $\mu$ or less by RMS can be obtained. It is therefore possible to completely prevent the occurrence of fine irregularities and blow holes in the glass surface. As a matter of course, it is also effective to form such thin films on the whole surface of the heat working jig and the pressing moulds, as well as the optical surfaces thereof.

The thermal deformation and the heat pressure forming using the heat working jig and the moulds permit the easy production of an optical glass preform and an optical glass element, both of which have no pit such as fine irregularities, blow holes, scratches or the like (for example, in a mirror surface with surface roughness of 0.005 $\mu$ or less by RMS).

In order to achieve the above object, the present invention also provides a method of producing an optical glass element comprising the steps of receiving a molten glass gob by a first heat working jig so as to roughly shape the glass gob under the influence of surface tension and gravity, making the molten glass gob on the first heat working jig to adhere to the second heat working jig in an oxygen free atmosphere and reversing the molten glass gob and the second heat working jig so as to displace the molten glass gob from the first heat working jig to the second working jig, thermally deforming the molten glass gob on the optical surface of the second heat working jig, i.e., deforming by heating under the influence of surface tension and gravity, to produce an optical glass preform having a free surface on one side and a transfer surface of the optical surface of the heat working jig on the other side, and forming the optical glass form, which is obtained by the thermal deformation, under heating and pressure using moulds to produce an optical glass element.

The molten glass is rapidly cooled from the surface thereof to form a thin film. The internal portions of the molten glass is at a high temperature and thus has low viscosity and high fluidity. If the temperature of a heat working jig is lower than that of the molten glass, when the molten glass is received by the first heat working jig, chill wrinkles remain on surface of the molten glass, which contacts with the first heat working jig, with a free surface being formed on the other surface by virtue of the surface tension of the glass. In an oxygen free atmosphere, the molten glass on the first heat working jig is caused to adhere to the second heat working jig which is then reversed together with the molten glass so that the molten glass is displaced from the first heat working jig to the second heat working jig. This process ensures that the molten glass is stably displaced only by bringing the first heat working jig into contact with the second heat working jig. The free surface of the molten glass, on which the thin film is formed, contacts with the second heat working jig, and the surface of the molten glass, which contacts with the first heat working jig and on which the chill wrinkles remain, is made free. At this time, since the temperature of the molten glass is extremely lower than that at a supplying a nozzle from which the molten glass is flowed out, and since the thin film is previously formed on the surface of the molten glass, no chill wrinkle occurs in the surface of the molten glass which contacts with the second heat working jig. In this state, when the molten glass is deformed by heating on the optical surface of the second heat working jig, the glass surface which contacts with the optical surface of the second working jig is slowly deformed so that the optical surface of the second heat working jig is correctly transferred, and the surface having the chill wrinkles forms a free surface while being smoothed out by virtue of the surface tension of glass. In this way, the optical glass preform having the transfer surface of the optical surface of the second heat working jig on one side and the free surface on the other side can be produced. The thus-formed optical glass preform is subjected to moulding under heating and pressure using moulds each having a desired shape and an optical surface to produce an optical glass element having high surface quality and surface accuracy.

In this process, the displacement of the optical glass gob from the first heat working jig to the second heat working jig makes use of the difference in wettability with high temperature glass between the two heat working jigs. Namely, the first heat working jig has relatively lower wettability with the molten glass and can be made of a material which does not easily adhere to the molten glass. Preferable examples of such materials having low wettability with the molten glass include carbon, graphite, glassy carbon, boron nitride, stainless steel, nickel-based alloys and the like. The second heat working jig is chemically stable and does not react with glass, but is relatively easily wetted with glass. Materials which relatively easily adhere to the molten glass can be used for the second heat working jig. Preferable examples include single metals such as tungsten, tantalum, rhenium, hafnium and the like and alloys thereof.

Examples of oxygen free atmospheres include atmospheres of inert gas such as nitrogen, argon, helium and the like; and mixed atmospheres containing the inert gas and gas appropriately selected from the group consisting of carbon oxides such as carbon monooxide, carbon dioxide and the like, hydrocarbons such as methane, ethane, ethylene, toluene and the like, halogenated hydrocarbons such as trichloroethylene, trichlorotrifluoroethane and the like, alcohols such as ethylene glycol, glycerin and the like and fluorocarbons such as F-113, F-11 and the like. The oxygen free atmosphere is appropriately selected depending upon conditions such as the composition of the optical glass, the materials of the heat working jigs, the compositions of the films coated on the moulds, the temperature and time of thermal deformation, the shape of the optical glass preform and so on.

In another aspect of the present invention, the present invention provides an apparatus for producing an optical glass element at least comprising a means for supplying molten glass to a first heat working jig, a heating means for heating a second heat working jig having a desired forming surface during the conveyance thereof, a holding means for holding the second heat working jig, which is heated by the heating means, in a position where the forming surface thereof looks downward, a press means for pressing the molten glass on the second heat working jig held by the holding means so as to cause it to adhere to the forming surface, a reversal means for reversing the second heat working jig, on which the molten glass is pressed, to a position where the forming surface looks upward, a thermal deformation means for thermally deforming the molten glass by carrying the second heat working jig, on which the molten glass is pressed, along the heating means to form an optical glass preform, and a slow cooling means for slowly cooling the glass preform carried on the second heat working jig.

The apparatus for producing an optical glass element of the present invention permits the molten glass on the first heat working jig to be displaced and caused to adhere to the heated second heat working jig without holding the molten glass by another jig. During this process, the displacement of the molten glass from the first working jig to the second heat working jig makes use of difference in its wettability with high temperature glass between the two heat working jig. The molten glass displaced from the first heat working jig to the second heat working jig is heated on the second heat working jig. The surface of the molten glass which contacts with the second heat working jig is slowly deformed so that the optical surface of the second heat working jig is correctly transferred, and the other surface thereof forms a free surface without no pit by virtue of the surface tension of the glass. Such thermal deformation of the molten glass permits the production of an optical glass form having the transfer surface of the optical surface of the second heat working jig on one side and the free surface on the other side. The heating of the second heat working jig, thermal deformation and also cooling are performed while carrying the second heat working jig by a carrying means comprising two fixed rod members with heat resistance which are provided in parallel so as to detachably support the second heat working jig at both sides thereof and a movable carrying member with good heat resistance which is interposed between the two fixed rod members for the purpose of intermittently carrying the second heat working jig on the fixed rod members. The carriage means is capable of preventing the occurrence of friction, which leads to occurrence of wear dust, between the fixed rod members and the second heat working jig during conveyance and preventing the adhesion of foreign substances to the optical glass preform and the deterioration of the moulds. The optical glass preform is moulded by using the press forming moulds each having a high precision shape and optical surface to produce an otpical glass element having high surface quality and surface accuracy.

In a further aspect of the present invention, the present invention provides a method of producing an optical glass element comprising the steps of receiving a gob or chunk of molten glass by a convex or plane first heat working jig so as to roughly shape it, causing the gob of molten glass on the first heat working jig to adhere to a second heat working jig and reversing the second heat working jig together with the molten glass gob so as to displace the molten glass gob from the first heat working jig to the second heat working jig, thermally deforming the molten glass gob on the optical surface of the second heat working jig to produce an optical glass preform having a free surface on one side and a transfer surface of the optical surface of the heat working jig on the other side, and forming the optical glass form, which is obtained by thermal deformation, under heating and pressure using moulds to obtain an optical glass element.

Chill wrinkles remain on the concave surface of the molten glass gob, which is received by the first heat working jig, and which contacts with the first heat working jig having a convex receiving-surface, and a free surface is formed in the other surface, which does not contact with the heat working jig, by virtue of the surface tension of the glass. The chill wrinkles on the concave surface, which is formed by contacting with the first heat working jig, are displaced to the second heat working jig to form a convex free surface when the molten glass gob is thermally deformed on the optical surface of the second heat working jig. The great thermal deformation from the concave surface having chill wrinkles to the convex free surface permits the removal of the surface pits. The molten glass gob is rapidly cooled from the surface thereof to form a thin film on its surface, while the interior of the molten glass gob is at a high temperature and has low viscosity and high fluidity. When the molten glass gob is shrunk by cooling, the interior at a high temperature is significantly shrunk, while the thin film on the surface is fixed and thus slightly shrunk. The difference in shrinkage between the surface and the interior of the molten glass gob causes the occurrence of stress at the interface between the second heat working jig and the molten glass and the occurrence of vacuum holes at the interface. The molten glass gob received by the convex first heat working jig has a small thickness at the center thereof and thus shows slight shrinkage at the high temperature portion. The method therefore has the effect of preventing the occurrence of vacuum holes at the interface between the second heat working jig and the molten glass gob.

DESCRIPTION OF THE PREFERRED EMBODIMENT

Figure 1:
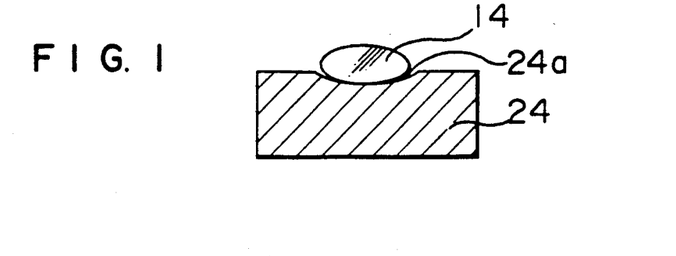
FIG. 1 is a sectional view of an embodiment of the present invention in which optical glass is loaded on a first heat working jig.
Figure 2:
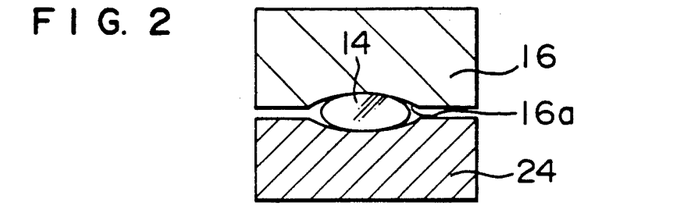
FIG. 2 is a sectional view of the embodiment in which the optical glass is made to adhere to a second working jig.
Figure 3:
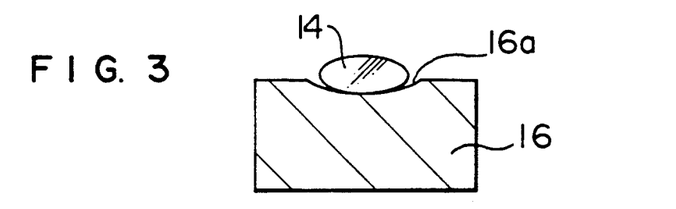
FIG. 3 is a sectional view of the embodiment in which the optical glass is displaced to the second heat working jig.
Figure 4:
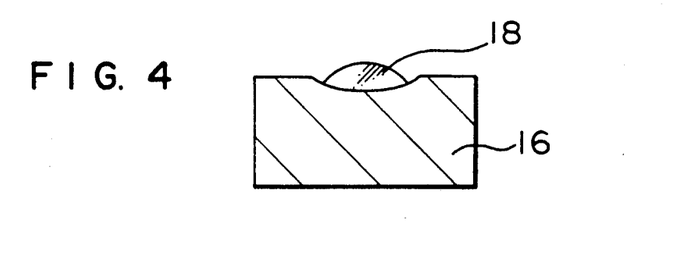
FIG. 4 is a sectional view of the embodiment in which the optical glass is thermally deformed on the second heat working jig.
Figure 5:
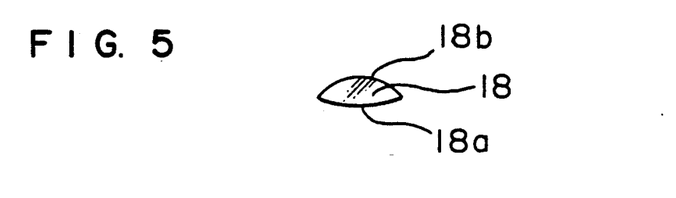
FIG. 5 is a sectional view of an optical glass preform.
Figure 6:
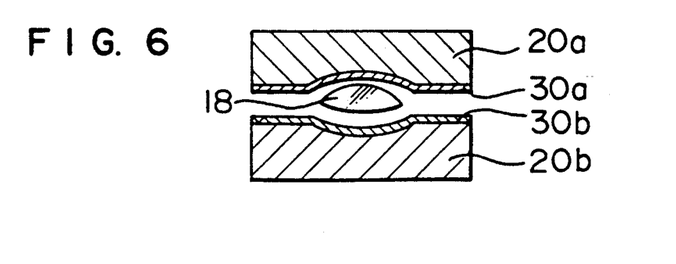
FIG. 6 is a sectional view of the embodiment in which the optical glass preform is moulded by using press forming moulds.

FIG. 1 is a sectional view of an embodiment of the present invention in which optical glass 14 is loaded on a first heat working jig 24. The drawing shows a state wherein the optical glass 14 is loaded on the first heat working jig 24 having a forming surface 24a of a given shape. FIG. 2 shows a state wherein the optical glass 14 on the first heat working jig 24 is made to adhere to the optical surface 16a of a second heat working jig 16. FIG. 3 shows a state wherein the optical glass 14 is placed on the second heat working jig 16 so as to be heated. FIG. 4 shows a state wherein the optical glass is deformed by heating on the second heat working jig 16 to form an optical glass preform 18. FIG. 5 is a sectional view of the optical glass preform 18 in which a transfer surface 18a is formed by the thermal deformation of the optical glass in the portion which contacts with the optical surface 16a of the second heat working jig 16, with a free surface 18b being formed in the portion which does not contact with the optical surface 16a of the second heat working jig 16. FIG. 6 shows a form in which the optical glass preform 18 is moulded by using pressing moulds 20a, 20b, which are coated with thin films 30a and 30b, respectively.

Figure 7:
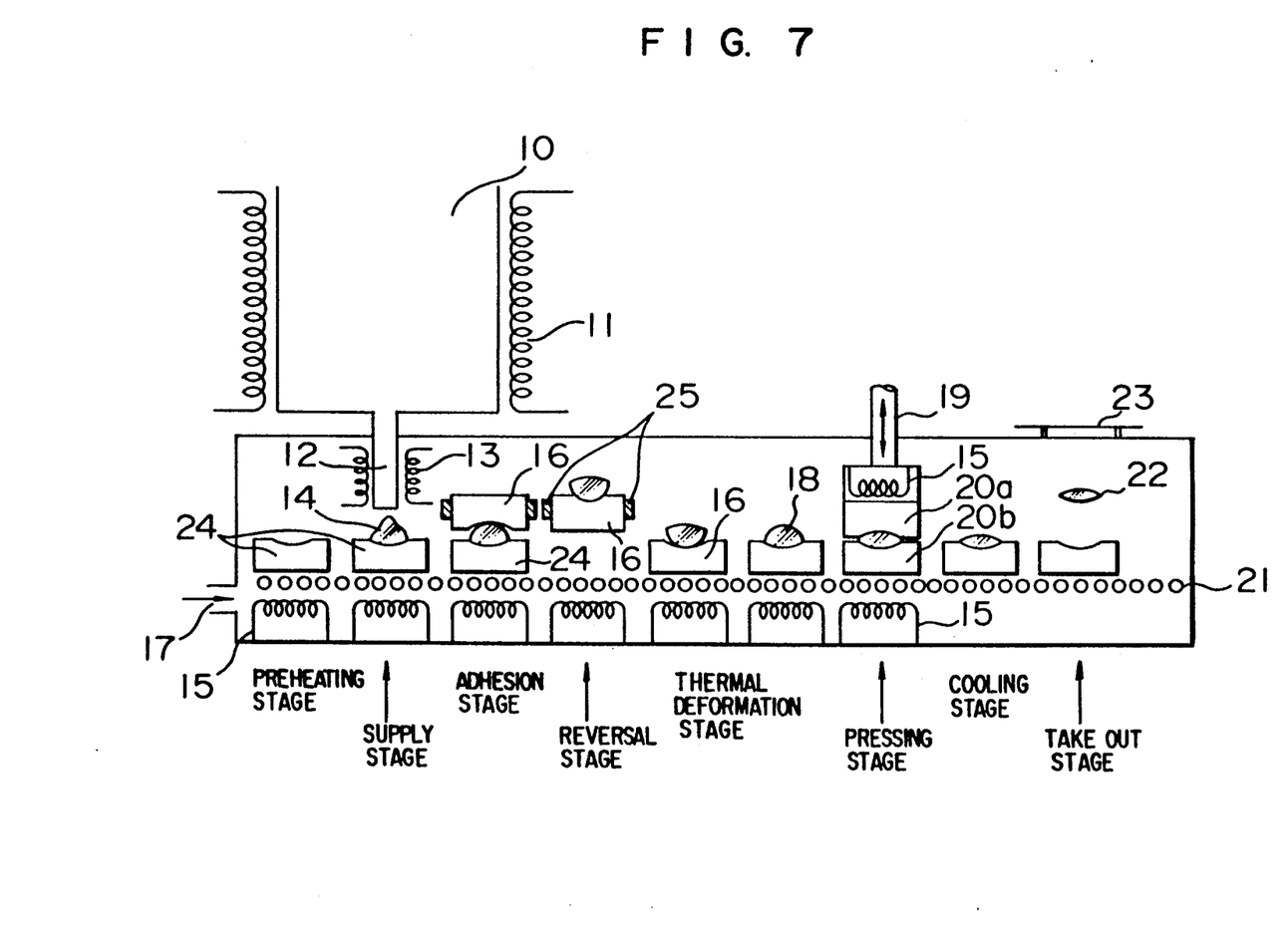
FIG. 7 is a sectional view of an embodiment of an apparatus for producing an optical glass element in accordance with the present invention.

FIG. 7 is an embodiment of an apparatus for producing an optical glass element in accordance with the present invention. The present invention is described in detail below with reference to the embodiment.

The thermal deformation and the moulding of optical glass 14 are performed in an production apparatus in which the interior of the housing is adjusted to desired atmosphere by introducing gas into the apparatus housing through a gas inlet 17, and in which the temperatures of a first heat working jig 24, a second heat working jig 16 and press forming moulds 20a, 20b are respectively controlled by heaters 15. The production apparatus comprises a preheating stage of preheating the second heat working jig 16, a supply stage of supplying the optical glass 14 to the first heat working jig 24, a contact stage of bringing the second heat working jig 16 preheated into contact with the optical glass 14 on the first heat working jig 24, a reversal stage of reversing the second heat working jig 16 which contacts with the optical glass 14, a thermal deformation stage of forming an optical glass preform 18 by thermally deforming the optical glass 14 on the second heat working jig 16, a moulding stage of moulding the optical glass preform 18 under heating and pressure by using the pressing moulds 20a, 20b, a cooling stage of cooling the optical glass element 22 obtained by moulding and a take out stage of discharging the optical glass element 22. The first heat working jig 24, the second heat working jig 16 and the press forming moulds 20a, 20b are placed on conveyer rollers 21 and moved in the apparatus. The optical glass 14 is heated and melted in a tank 10 by a heater 11. The temperature of a supplying nozzle 12 is controlled by a heater 13 so that a desired weight of optical glass 14 is dropped from the nozzle 12 to the first heat working jig 24, which is preheated in the preheating stage, at the position of the supply stage. In the thermal deformation stage, the optical glass 14 is heated on the second heat working jig 16 to form the optical glass preform 18 having a regular shape. In the moulding stage, the optical glass preform 18 is continuously subjected to forming under heating and pressure using the moulds 20a, 20b, each of which is finished to a surface having a high precision shape and surface roughness, and a cylinder 19. After the mould, the optical glass element 22 is cooled in the cooling stage while being held by the moulds 20a, 20b. In the take out stage, the optical glass element 22 cooled is discharged from the outlet port 23.

Another embodiment of the present invention is described in detail below with reference to FIG. 8.

A production apparatus comprises a supply stage of supplying optical glass 14 to a first heat working jig 24, a contact stage of bring second heat working jig 16, which is preheated, into contact with the optical glass 14 on the first heat working jig 24, a reversal stage of reversing the second heat working jig 16 which contacts with the optical glass 14, a thermal deformation stage of thermally deforming the optical glass 14 by heating on the second heat working jig 16 to form an optical glass preform 18, a press forming stage of forming the optical glass preform 18 under heating and pressure by using moulds 20a, 20b, a cooling stage of cooling the optical glass element 22 obtained by the press forming and a take out stage of discharging the optical glass element 22. The apparatus has generally the same function as that of the apparatus shown in FIG. 7. It is necessary to pay attention to the point that the first heat working jig 24, which receives the optical glass 14, has a convex forming surface 24a. The optical glass 14 on the first heat working jig 24 therefore has a form of a meniscus. The glass 14 having a form of a meniscus is made to adhere to the second heat working jig 16 and then reversed together with the second heat working jig 16. In the thermal deformation stage, the optical glass 14 is heated to form the optical glass preform 18 having a regular shape, as shown in FIG. 5.

The pressing moulds 20a, 20b are previously heated (not shown) so that the optical glass 14 is heated and formed under pressure by using the moulds 20a, 20beach of which has a desired shape and surface roughness, and the cylinder 19 in the moulding stage. After the moulding, the optical glass element 22 is cooled while being held by the moulds 20a, 20b in the cooling stage. In the take out stage, the optical glass element 22 cooled is discharged from an outlet port 23.

A further embodiment of the present invention is described in detail below with reference to FIGS. 9, 10 and 11.

Figure 9:
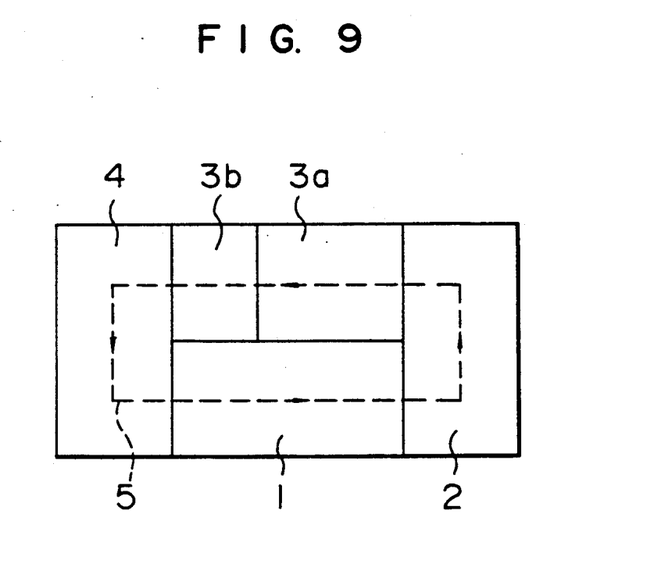
FIG. 9 is a schematic diagram of the basic arrangement of the apparatus for producing an optical glass element in the another embodiment of the present invention.

FIG. 9 is a schematic diagram of the basic arrangement of an apparatus for producing an optical glass preform in a further embodiment of the present invention. In FIG. 9, the apparatus comprises a preheating chamber 1 for preheating a second heat working jig 16, a supply chamber 2 for supplying optical glass 14 to the second heat working jig 16 from a first heat working jig 24, a heating chamber 3a for thermally deforming the optical glass 14 on the second heat working jig 16, a slow cooling chamber 3b for slowly cooling an optical glass preform 18, a recovery chamber 4 for recovering the optical glass preform 18, and a transfer means 5 for transferring the second heat working jig 16. In this embodiment, the preheating chamber 1 and the heating chamber 3a kand the slow cooling chamber 3b are provided in parallel with each other, and the supply chamber 2 and the recovery chamber 4 are provided at both ends of the chambers 1, 3a and 3b so that the second heat working jig 16 can be circularly transferred by the transfer means 5. In this embodiment, although a means for forming an optical glass element 22 by heat pressure forming using moulds 20a, 20b, each of which has a desired shape and surface roughness, and a cylinder 19 is not provided, the means can be provided as occasion demands.

Figure 10:
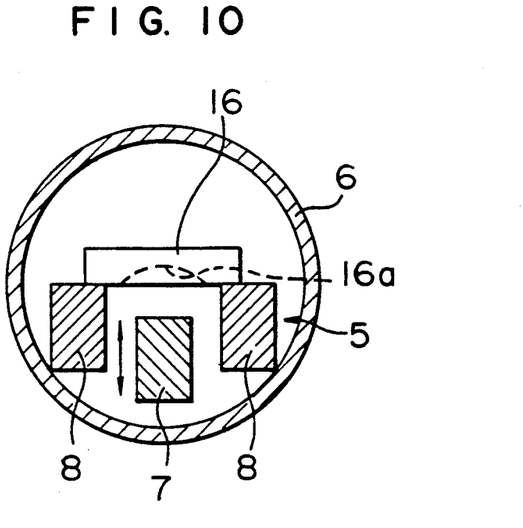
FIG. 10 is a sectional view which shows the carrying form of the second heat working jig in the apparatus for producing an optical glass element in the another embodiment of the present invention.

FIG. 10 is a sectional view which shows a manner of conveyance of the second heat working jig 16 in the apparatus for producing an optical glass preform in the further embodiment of the present invention. In FIGS. 10 and 11, the transfer means 5 comprising two fixed rod members 8 and a carrying member 7 is disposed in the transfer direction in each of the core tubes 6 which are respectively provided in the preheating chamber 1 and the heating chamber 3 and the slow cooling chamber 3b. The two fixed rod members 8 are fixed in parallel with each other at a distance smaller than the outer diameter of the second heat working jig 16 by means of a fixing jig (not shown) disposed outside each of the core tubes 6. The two fixed rod members 8 detachably support the second heat working jig 16 at both sides thereof In order to move the second heat working jig 16, the carrying member 7 is placed at a lower height level where it does not contact with the second heat working jig 16 in an early stage, and it is then moved upward so as to raise the second heat working jig 16 at the timing of conveyance. The carrying member 7 is then horizontally moved with a predetermined pitch and then downwardly moved to the initial height level. During this movement, the second heat working jig 16 is horizontally moved with a predetermined pitch along the fixed rod members 8 without contacting with those members in general. When the carrying member 7 at the initial height level is moved in the direction reverse to conveyance to return to the initial position, one cycle of conveyance of the second heat working jig 16 is completed.

Figure 11:
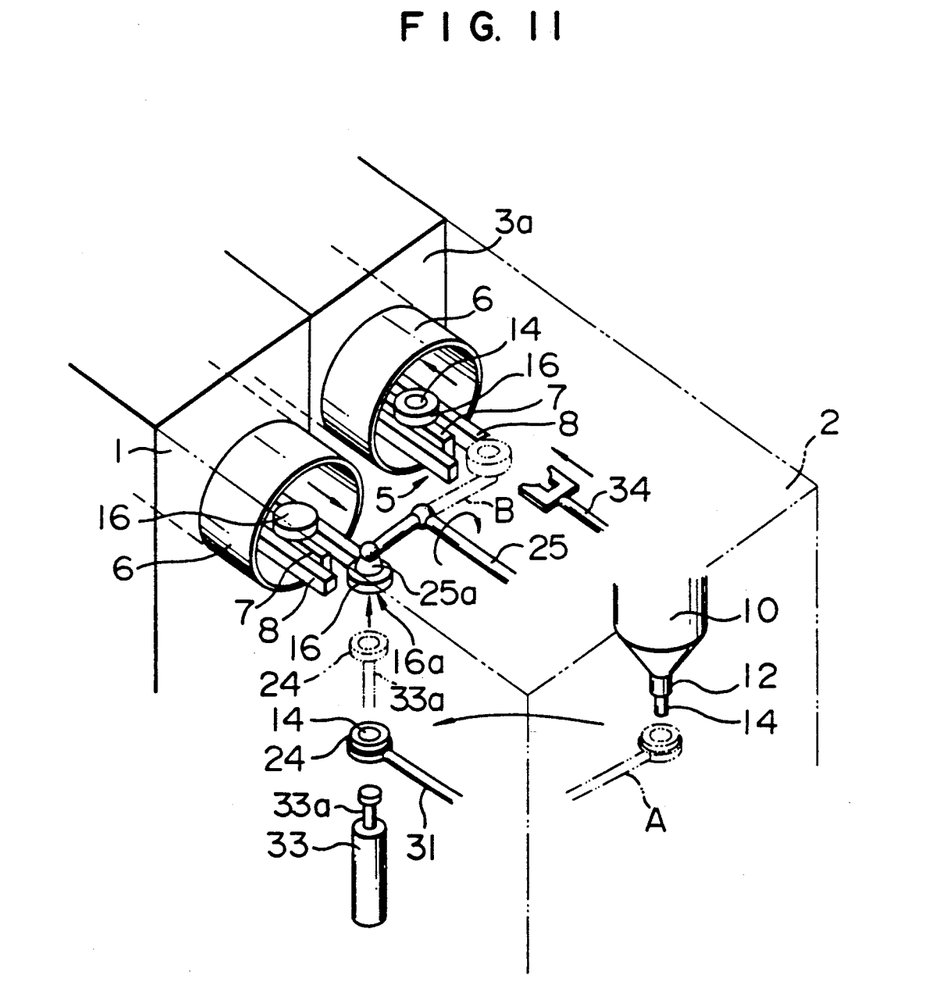
FIG. 11 is a perspective view of the apparatus for producing an optical glass element in the another embodiment of the present invention.

FIG. 11 is a perspective view of the apparatus for producing an optical glass preform in the further embodiment of the present invention. A desired weight of optical glass 14 is dropped onto the first heat working jig 24, which is mounted on the end portion of a carrying arm 31, from a nozzle 12 provided at the end of a tank 10 (refer to phantom lines A in the drawing). The second heat working jig 16 is carried by the two fixed rod members 8 and the carrying member 7 in the preheating chamber 1 so as to be heated to a predetermined temperature. The carrying arm 31 is rotated to the position of the second heat working jig 16 preheated. In the supply chamber 2, the second heat working jig 16 is held by the vacuum suction chuck 25a of a reversing arm 25, and the first heat working jig 24 is then pushed upward by a piston rod 33a of a cylinder 33 until the optical glass 14 contacts with the optical surface 16a of the second heat working jig 16. The optical surface 16a of the second heat working jig 16 is made of a material or a thin film which has good wettability with the optical glass 14 at high temperature and which is chemically stable and does not react with the glass. The optical glass 14 is therefore made to adhere to the second heat working jig 16 and displaced from the first heat working jig 24 to the second heat working jig 16. In this state, the reversal arm 25 is reversed to the position where it can be inserted into the heating chamber 3a (refer to phantom lines B in the drawing), and the second heat working jig 16 is rapidly sent into the core tube 6 provided in the heating chamber 3a by a pusher 34. The optical glass 14 on the second heat working jig 16 is thermally deformed by heating to a predetermined temperature while being carried by the transfer means 5 comprising the two fixed rod members 8 and the carrying member 7 in the heating chamber 3a in the same way as in preheating of the second heat working jig 16 to form the optical glass preform 18. The optical glass preform 18 is slowly cooled to a predetermined temperature while being carried by the two fixed rod members 8 and the carrying member 7 in the slow cooling chamber 3b. The optical glass preform 18 slowly cooled is recovered by the vacuum suction chuck (not shown) in the recovery chamber 4.

EXAMPLE 1

A first heat working jig 24 was formed so as to have a concave form with a radius of curvature of 15 mm by using carbon. A second heat working jig 16 was formed so as to have a concave optical surface 16a with a radius of curvature of 15 mm by using a hard metal (WC-5TiC-8Co) as a base material. The optical surface 16a was lapped with fine diamond powder to form a mirror surface with surface roughness (RMS) of about 25° Å after about 1 hour had passed. The mirror surface of the second heat working jig 16 was coated with a film of an platinum-iridium-osmium alloy (Pt-Ir-Os) by a sputtering process to form the second heat working jig 16 shown in FIG. 2. A hard metal (WC-5TiC-8Co) was used as a base material for forming a pair of members, having concave surface, with a radius of curvature of 20 mm in the same way as in the second heat working jig 16. The surfaces having a concave shape respectively were coated with thin films 30a, 30b of a platinum-iridium-osmium alloy (Pt-Ir-Os) by the sputtering process to form pressing moulds 20a, 20b, respectively.

The thermal deformation and the moulding of the optical glass 14 were performed by using the production apparatus shown in FIG. 7. The optical glass was heated and melted at 1100° C. in the tank 10 by the heater 11. The temperature of the nozzle 12 was controlled to 800° C. by the heater 13 so that about 2-gram. of optical glass 14 was dropped from the nozzle 12 on the first heat working jig 24, which was preheated to 200° C. in the preheating stage, at the position of the supply stage. Barium borosilicate glass consisting of 30% by weight of silica ($SiO_2$), 50% by weight of barium oxide (BaO), 15% by weight of boric acid ($B_2O_3$) and the balance of trace components was used as the optical glass 14. The interior of the production apparatus was kept at an atmosphere obtained by mixing nitrogen gas at 20 l/min and hydrogen gas at 2 l/min. The optical glass 14 on the first heat working jig 24 was pressed on the second heat working jig 16 preheated to 650° C. so as to be made to adhere to the second heat working jig 16. The second heat working jig 16, to which the optical glass 14 adhered, was reversed by the arm 25 so that the optical glass 14 was displaced to the second heat working jig 16. In the thermal deformation stage, the optical glass 14 on the second heat working jig 16 was thermally deformed by the heater 15 to produce the optical glass preform 18 having the transfer surface 18a and the free surface 18b shown in FIG. 5. The conditions for heat working were 640° C. and 10 minutes. After the thermal deformation, the optical glass preform 18 was moulded by using the moulds 20a, 20b in the moulding stage. The conditions for moulding were the mould temperature of 560° C., the press pressure of 30 $Kg/cm^2$ and the press time of 2 minutes. The optical glass element 22 was slowly cooled to 300° C. in the slow cooling stage and then discharged from the outlet port 23.

In the optical glass element 22 which was formed by the above process, the press-moulded surface was an optical mirror surface having surface roughness (RMS) of about 25 Å, and neither fine irregularities nor scratches were observed in the surface. The surface accuracy was within two Newton rings of power and one fifth ring of irregularity or less, and the optical performance had high surface quality and surface accuracy.

EXAMPLE 2

A first heat working jig 24 was formed so as to have a concave form having a radius of curvature of 45 mm by using boron nitride. A second heat working jig 16 was formed so as to have a concave optical surface 16a having a radius of curvature of 45 mm by using austenitic steel (JIS SUS316) as a base material. The optical surface 16a was further lapped by using fine powder of diamond to form a mirror surface having surface roughness (RMS) of about 30 Å after about 1 hour had passed. The mirror surface of the second heat working jig 16 was coated with a thin film of a platinum-iridium-osmium alloy (Pt-Ir-Os) by the sputtering process to form the second heat working jig 16 shown in FIG. 2. Austenitic steel (JIS SUS316) was used as a base material to form concave shapes each having a radius of curvature of 150 mm in the same way as in the second heat working jig 16. The thus-formed concave shapes were coated with thin films 30a, 30b of a rhodium-gold-tungsten alloy (Rh-Au-W) by the sputtering process to form pressing moulds 20a, 20b, respectively.

The thermal deformation and the moulding of the optical glass 14 were performed by using the production apparatus shown in FIG. 7. The optical glass was heated and melted at 1400° C. in the tank 10 by the heater 11. The temperature of the nozzle 12 was controlled to 950° C. by the heater 13 so that about three-gram of optical glass 14 was dropped from the nozzle 12 to the first heat working jig 24, which was preheated to 400° C. in the preheating stage, at the position of the supply stage. Lanthanum glass consisting of 8% by weight of zirconia ($ZrO_2$), 30% by weight of lanthanum xoide ($La_2O_3$), 42% by weight or boric acid ($B_2O_3$), 10% by weight of calcium oxide (CaO) and the balance of trace components was used as the optical glass 14. The interior of the production apparatus was kept at an atmosphere obtained by mixing nitrogen gas at 20 l/min and trichlorotrifluoroethane at 1 l/min. The optical glass 14 on the first heat working jig 24 was pressed on the second heat working jig 16 preheated to 700° C. so as to be made to adhere to the second heat working jig 16. The second heat working jig 16, to which the optical glass 14 adhered, was reversed by the arm 25 so that the optical glass 14 was displaced to the second heat working jig 16. In the thermal deformation stage, the optical glass 14 on the second heat working jig 16 was thermally deformed by the heater 15 to produce the optical glass preform 18 having the transfer surface 18a and the free surface 18b shown in FIG. 5. The conditions for heat working were 780° C. and 20 minutes. After the thermal deformation, the optical glass preform 18 was subjected to moulding by using the moulds 20a, 20b in the moulding stage. The conditions for moulding were the mould temperature of 680° C., the press pressure of 30 Kg/cm² and the press time of 2 minutes. The optical glass element 22 was slowly cooled to 400° C. in the slow cooling stage and then discharged from the outlet port 23.

In the optical glass element 22 which was formed by the above process, the moulded surface was an optical mirror surface having surface roughness (RMS) of about 20 Å, and neither fine irregularities nor scratches were observed in the surface. The surface accuracy was within two Netwon rings of power and one fifth ring of irregularity or less, and the optical prformance was extremely excellent.

EXAMPLE 3

A first heat working jig 24 was formed so as to have a concave surface having a radius of curvature of 200 mm by using aluminum nitride. A second heat working jig 16 was formed so as to have a concave optical surface 16a having a radius of curvature of 200 mm by using a block of platinum-tantalum-rhenium alloy (Pt-Ta-Re). The optical surface 16a was further lapped by using fine powder of diamond to form a mirror surface having surface roughness (RMS) of about 30° Å after about 1 hour had passed. Cermet (TiC-10Mo-9Ni) was used as a base material to form concave shapes each having a radius of curvature of 500 mm, which were then coated with thin films 30a, 30b of a platinum-tantalum-rhenium alloy (Pt-Ta-Re) by the sputtering process to form pressing moulds 20a, 20b, respectively.

The thermal deformation and the moulding of the optical glass 14 were performed by using the production apparatus shown in FIG. 7. The optical glass was heated and melted at 1350° C. in the tank 10 by the heater 11. The temperature of the nozzle 12 was controlled to 920° C. by the heater 13 so that about 3-gram of optical glass 14 was dropped from the nozzle 12 to the first heat working jig 24, which was preheated to 550° C. in the preheating stage, at the position of the supply stage. Barium borosilicate glass consisting of 65% by weight of silica ($SiO_2$), 9% by weight of potassium oxide ($K_2O$), 10% by weight of boric acid ($B_2O_3$), sodium oxide ($Na_2O$) and the balance of trace components was used as the optical glass 14. The interior of the production apparatus was kept at an atmosphere obtained by mixing argon gas at 20 l/min and ethylene ($C_2H_4$) at 1 l/min. The optical glass 14 on the first heat working jig 24 was pressed on the second heat working jig 16 preheated to 800° C. so as to made to adhere to the second heat working jig 16. The second heat working jig 16, to which the optical glass 14 adhered, was reversed by the arm 25 so that the optical glass 14 was displaced to the second heat working jig 16. In the thermal deformation stage, the optical glass 14 on the second heat working jig 16 was thermally deformed by the heater 15 to obtain the optical glass preform 18 having the transfer surface 18a and the free surface 18b shown in FIG. 5. The conditions for heat working were 780° C. and 5 minutes. After the thermal deformation, the optical glass preform 18 was subjected to moulding by using the moulds 20a, 20b in the moulding stage. The conditions for moulding were the mould temperature of 680° C., the press pressure of 80 Kg/cm² and the press time of 1 minute. The optical glass element 22 was slowly cooled to 380° C. in the slow cooling stage and then discharged from the outlet port 23.

In the optical glass element 22 which was formed by the above process, the moulded surface was an optical mirror surface having surface roughness (RMS) of about 20° Å, and neither fine irregularities nor scratches were observed in the surface. The surface accuracy was within two Newton rings of power and one fifth ring of irregurality or less, and the optical performance was extremely execllent.

EXAMPLE 4

A first heat working jig 24 was formed so as to have a concave surface having a radius of curvature of 45 mm by using martensitic stainless steel (JIS SUS420). A second heat working jig 16 was formed so as to have a concave optical surface 16a having a radius of curvature of 55 mm by using silicon as a base material. The optical surface 16a was further lapped by using fine powder of diamond to form a mirror surface having surface roughness (RMS) of about 20 Å after about 1 hour had passed. The mirror surface of the second heat working jig 16 was coated with a thin film of a rhodium-gold-tungsten alloy (Rh-Au-w) by the sputtering process to form the second heat working jig 16 shown in FIG. 2. Concave shapes each having a radius of curvature of 100 mm were formed by using as a base material silicon in the same way as in the second heat working jig 16 and then coated with thin films 30a, 30b of a rhodium-gold-tungsten alloy (Rh-Au-W) by the sputtering process to form pressing moulds 20a, 20b, respectively.

The thermal deformation and the moulding of the optical glass 14 were performed by using the production apparatus shown in FIG. 7. The optical glass was heated and melted at 1250° C. in the tank 10 by the heater 11. The temperature of the nozzle 12 was controlled to 750° C. by the heater 13 so that about 5-gram of optical glass 14 was dropped from the nozzle 12 to the first heat working jig 24, which was not preheated in the preheating stage, at the position of the supply stage. Dense flint glass consisting of 52% by weight of silica ($SiO_2$), 6% by weight of potassium oxide ($K_2O$), 35% by weight of lead oxide (PbO), 5% by weight of sodium oxide ($Na_2O$) and the balance of trace components was used as the optical glass 14. The interior of the production apparatus was kept at an atmosphere obtained by mixing helium gas at 20 l/min and carbon dioxide at 2 l/min. The optical glass 14 on the first heat working jig 24 was pressed on the second heat working jig 16 preheated to 600° C. so as to made to adhere to the second heat working jig 16. The second heat working jig 16, to which the optical glass 14 adhered, was reversed by the arm 25 so that the otpical glass 14 was displaced to the second heat working jig 16. In the thermal deformation stage, the optical glass 14 on the second heat working jig 16 was thermally deformed by the heater 15 to obtain the optical glass preform 18 having the transfer surface 18a and the free surface 18b shown in FIG. 5. The conditions for heat working were 610° C. and 5 minutes. After the thermal deformation, the optical glass preform 18 was subjected to moulding by using the moulds 20a, 20b in the moulding stage. The conditions for moulding were the mould temperature of 550° C., the press pressure of 80 Kg/cm$^2$ and the press time of 1 minute. The optical glass element 22 was slowly cooled to 380° C. in the slow cooling stage and then discharged from the outlet port 23.

In the optical glass element 22 which was formed by the above process, the press-formed surface was an optical mirror surface having surface roughness (RMS) of about 20 Å, and neither fine irregularities nor scratches were observed in the surface. The surface accuracy was within two Newton rings of power and one fifth ring of irregularity or less, and the optical performance was extremely excellent.

EXAMPLE 5

A first heat working jig 24 was formed so as to have a plane forming surface by using carbon. A second heat working jig 16 was formed so as to have a concave optical surface 16a having a radius of curvature of 15 mm by using as a base material a hard metal (WC-5TiC-8Co). The optical surface 16a was further lapped by using fine powder of diamond to form a mirror surface having surface roughness (RMS) of about 30 Å after about 1 hour had passed. The mirror surface of the second heat working jig 16 was coated with a thin film of a platinum-iridium-osmium alloy (Pt-Ir-Os) by the sputtering process to form the second heat working jig 16 shown in FIG. 2. Concave shapes each having a radius of curvature of 20 mm were formed by using as a base material a hard metal in the same way as in the second heat working jig 16 and then coated with thin films 30a, 30b of a platinum-iridium-osmium alloy (Pt-Ir-Os) by the sputtering process to form moulds 20a, 20b, respectively.

Figure 8:
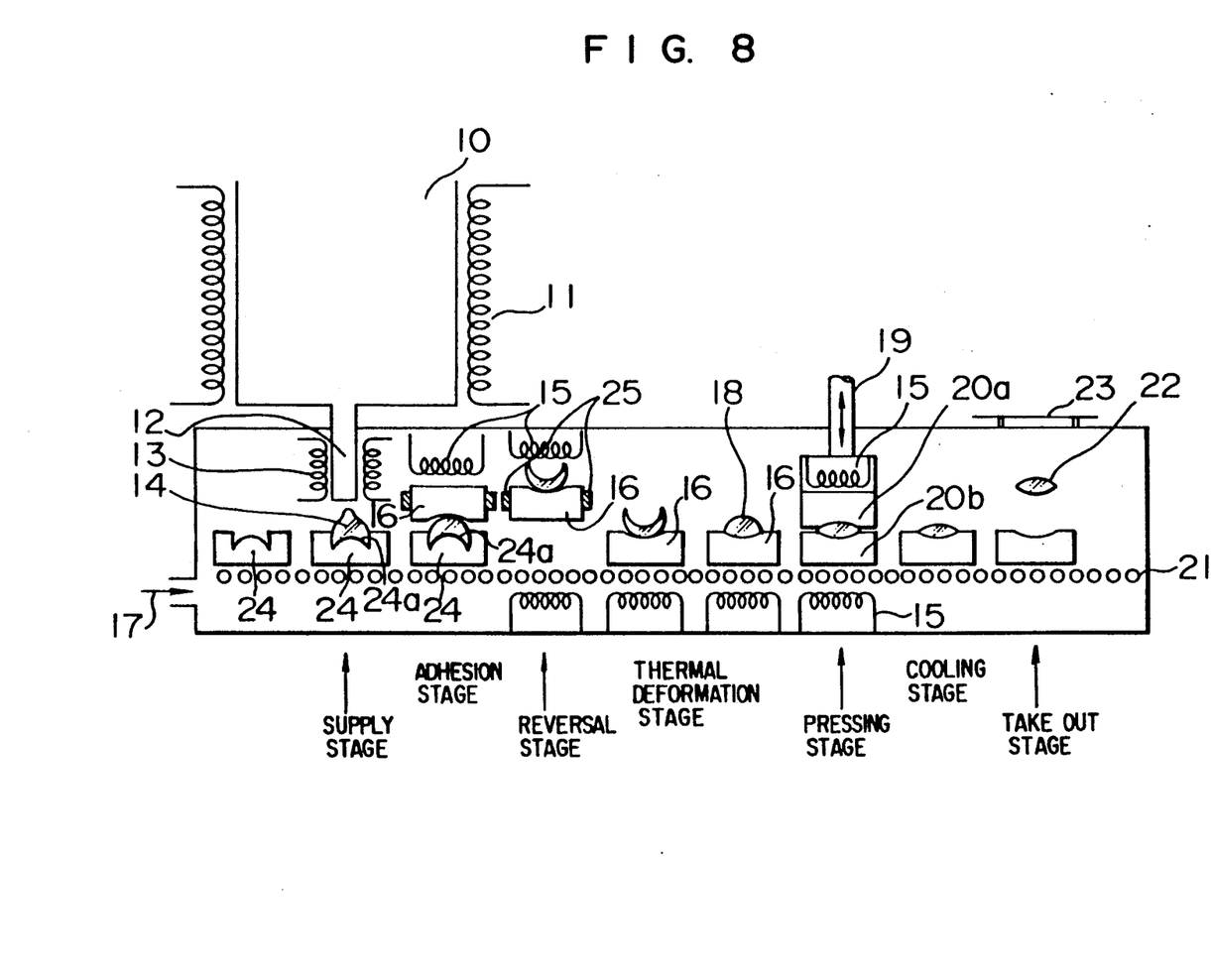
FIG. 8 is a sectional view of another embodiment of an apparatus for producing an optical glass element in accordance with the present invention.

The thermal deformation and the press forming of the optical glass 14 were performed by using the production apparatus shown in FIG. 8. The optical glass was heated and melted at 1200° C. in the tank 10 by the heater 11. The temperature of the nozzle 12 was controlled to 800° C. by the heater 13 so that about 2 g of optical glass 14 was dropped from the nozzle 12 to the first heat working jig 24, which was not preheated in the preheating stage, at the position of the supply stage. Barium borosilicate glass consisting of 30% by weight of silcia ($SiO_2$), 50% by weight of barium oxide (BaO), 15% by weight of boric acid ($B_2O_3$) and the balance of trace components was used as the optical glass 14. The interior of the production apparatus was kept at an atmosphere obtained by mixing nitrogen gas at 20 l/min and hydrogen gas at 2 l/min. The optical glass 14 on the first heat working jig 24 was pressed on the second heat working jig 16 preheated to 650° C. so as to be made to adhere to the second heat working jig 16. The second heat working jig 16, to which the optical glass 14 adhered, was reversed by the arm 25 so that the optical glass 14 was displaced to the second heat working jig 16. The optical glass 14 displaced to the second heat working jig 16 had a plano-convex shape. In the thermal deformation stage, the optical glass 14 on the second heat working jig 16 was thermally deformed by the heater 15 to produce the optical glass preform 18 having the transfer surface 18a and the free surface 18b shown in FIG. 5. The conditions for heat working were 640° C. and 10 minutes. After the thermal deformation, the optical glass preform 18 was subjected to moulding by using the moulds 20a, 20b in the moulding stage. The conditions for moulding were the mould temperature of 560° C., the press pressure of 30 Kg/cm$^2$ and the press time of 2 minutes. The optical glass element 22 was slowly cooled to 300° C. in the slow cooling stage and then discharged from the outlet port 23.

In the optical glass element 22 which was formed by the above process, the moulded surface was an optical mirror surface having surface roughness (RMS) of about 25 Å, and no pits such as fine irregularities, pores or scratches were observed in the surface. The surface accuracy was within two Newton rings of power and one fifth ring of irregularity or less, and the optical performance had high surface quality and surface accuracy.

EXAMPLE 6

A first heat working jig 24 was formed so as to have a convex surface having a radius of curvature of 45 mm by using boron nitride. A second heat working jig 16 was formed so as to have a concave optical surface 16a having a radius of curvature of 45 mm by using as a base material austenite steel (JIS SUS316). The optical surface 16a was further lapped by using fine powder of diamond to form a mirror surface having surface roughness (RMS) of about 30 Å after about 1 hour had passed. The mirror surface of the second heat working jig 16 was coated with a thin film of a platinum-iridium-osmium alloy (Pt-Ir-Os) by the sputtering process to form the second heat working jig 16 shown in FIG. 2. Concave shapes each having a radius of curvature of 150 mm were formed by using as a base material austenite steel (JIS SUS316) in the same way as in the second heat working jig 16 and then coated with thin films 30a, 30b of a rhodium-gold-tungsten alloy (Rh-Au-W) by the sputtering process to form moulds 20a, 20b, respectively.

The thermal deformation and the moulding of the optical glass 14 were performed by using the production apparatus shown in FIG. 8. The optical glass was heated and melted at 1400° C. in the tank 10 by the heater 11. The temperature of the nozzle 12 was controlled to 950° C. by the heater 13 so that about three-gram of optical glass 14 was dropped from the nozzle 12 to the first heat working jig 24, which was not preheated in the preheating stage, at the position of the supply stage. Lanthanum glass consisting of 8% by weight of zirconia ($ZrO_2$), 30% by weight of lanthanum oxide ($La_2O_3$), 42% by weight of boric acid ($B_2O_3$), 10% by weight of of calcium oxide (CaO) and the balance of trace components was used as the optical glass 14. The interior of the production apparatus was kept at an atmosphere obtained by mixing nitrogen gas at 20 l/min and trichlorotrifluoroethane ($C_2Cl_3F_3$) gas at 1 l/min. The optical glass 14 on the first heat working jig 24 was pressed on the second heat working jig 16 preheated to 700° C. so as to be made to adhere to the second heat working jig 16. The second heat working jig 16, to which the optical glass 14 adhered, was reversed by the arm 25 so that the optical glass 14 was displaced to the second heat working jig 16. The optical glass 14 displaced to the second heat working jig 16 had a meniscus shape. In the thermal deformation stage, the optical glass 14 on the second heat working jig 16 was thermally deformed by the heater 15 to obtain the optical glass preform 18 having the transfer surface 18a and the free surface 18b shown in FIG. 5. The conditions for heat working were 780° C. and 20 minutes. After the thermal deformation, the optical glass preform 18 was subjected to moulding by using the moulds 20a, 20b in the moulding stage. The conditions for moulding were the mould temperature of 680° C., the press pressure of 30 Kg/cm$^2$ and the press time of 2 minutes. The optical glass element 22 was slowly cooled to 400° C. in the slow cooling stage and then discharged from the outlet port 23.

In the optical glass element 22 which was formed by the above process, the moulded surface was an optical mirror surface having surface roughness (RMS) of about 20 Å, and no pits such as fine irregularities, pores or scratches were observed in the surface. The surface accuracy was within two Newton rings o power and one fifth ring of irregularity or less, and the optical performance was extremely excellent.

EXAMPLE 7

A first heat working jig 24 was formed so as to have a convex surface having a radius of curvature of 200 mm by using aluminum nitride. A second heat working jig 16 was formed so as to have a concave optical surface 16a having a radius of curvature of 200 mm by using a block of a platinum-tantalum-rhenium alloy (Pt-Ta-Re). The optical surface 16a was further lapped by using fine powder of diamond to form a mirror surface having surface roughness (RMS) of about 30 Å after about 1 hour had passed. Concave shapes each having a radius of curvature of 500 mm were formed by using as a base material cermet (TiC-10Mo-9Ni) and then coated with thin films 30a, 30b of a platinum-tantalum-rhenium (Pt-Ta-Re) by the puttering process to form moulds 20a, 20b, respectively.

The thermal deformation and the moulding of the optical glass 14 were performed by using the production apparatus shown in FIG. 8. The optical glass was heated and melted at 1350° C. in the tank 10 by the heater 11. The temperature of the nozzle 12 was controlled to 920° C. by the heater 13 so that about three-gram of optical glass 14 was dropped from the nozzle 12 to the first heat working jig 24, which was not preheated in the preheating stage, at the position of the supply stage. Barium borosilicate glass consisting of 65% by weight of silica ($SiO_2$), 9% by weight of potassium oxide ($K_2O$), 10% by weight of boric acid ($B_2O_3$), 10% by weight of sodium oxide ($Na_2O$) and the balance of trace components was used as the optical glass 14. The interior of the production apparatus was kept at an atmosphere produced by mixing argon gas at 20 l/min and ethylene ($C_2H_4$) gas at 1 l/min. The optical glass 14 on the first heat working jig 24 was pressed on the second heat working jig 16 preheated to 800° C. so as to be made to adhere to the second heat working jig 16. The second heat working jig 16, to which the optical glass 14 adhered, was reversed by the arm 25 so that the optical glass 14 was displaced to the second heat working jig 16. The optical glass 14 displaced to the second heat working jig 16 had a meniscus shape. In the thermal deformation stage, the optical glass 14 on the second heat working jig 16 was thermally deformed by the heater 15 to obtain the optical glass preform 18 having the transfer surface 18a and the free surface 18b shown in FIG. 5. The conditions for heat working were 780° C. and 5 minutes. After the thermal deformation, the optical glass preform 18 was subjected to moulding by using the moulds 20a, 20b in the moulding stage. The conditions for moulding were the mould temperature of 680° C., the press pressure of 80 Kg/cm$^2$ and the press time of 1 minute. The optical glass element 22 was slowly cooled to 380° C. in the slow cooling stage and then discharged from the outlet port 23.

In the optical glass element 22 which was formed by the above process, the moulded surface was an optical mirror surface having surface roughness (RMS) of about 20 Å, and no pits such as fine irregularities, pores or scratches were observed in the surface. The surface accuracy was within two Newton rings of power and one fifth ring of irregularity or less, and the optical performance was extremely excellent.

EXAMPLE 8

A first heat working jig 24 was formed so as to have a concave surface having a radius of curvature of 45 mm by using martensite stainless steel (JIS SUS420). A second heat working jig 16 was formed so as to have a concave optical surface 16a having a radius of curvature of 55 mm by using as a base material silicon. The optical surface 16a was further lapped by using fine powder of diamond to form a mirror surface having surface roughness (RMS) of about 20 Å after about 1 hour had passed. The mirror surface of the second heat working jig 16 was coated with a film of a rhodium-gold-tungsten alloy (Rh-Au-W) by the sputtering process to form the second heat working jig 16 shown in FIG. 2.

The thermal deformation of the optical glass 14 was performed by using the production apparatus shown in FIG. 11. Dense flint glass consisting of 52% by weight of silica ($SiO_2$), 6% by weight of potassium oxide ($K_2O$), 35% by weight of lead oxide (PbO), 5% by weight of sodium oxide ($Na_2O$) and the balance of trace components was used as the otpical glass 14. The interior of the production apparatus was kept at an atmosphere obtained by mixing helium gas at 20 l/min and carbon dioxide gas at 2 l/min. About 5-gram of the optical glass 14 was dropped from the nozzle 12 provided at the end of the tank 10 to the first heat working jig 24, which was mounted to the carrying arm 31 (the phantom lines A in the drawing). The second heat working jig 16 was heated while being successively carried by the two fixed rod members 8 and the carrying member 7 in the preheating chamber 1, which was kept at 600° C., in a state the optical surface 16a turned downward. The carrying arm 31 was rotated half revolution to the position of the second heat working jig 16 preheated. In the supply chamber 2, the second heat working jig 16 was held by suction by the vacuum chuck 25a of the reversal arm 25 and then pushed up by cylidner 33 until the optical glass 14 contracted with the optical surface 16a of the second heat working jig 16. Since the optical surface 16a of the second heat working jig 16 was made of a thin film which had good wettability with the optical glass 14 at high temperature and which was chemically stable and produces no reaction, the optical glass 14 was made to adhere to the second heat working jig 16 and displaced from the first heat working jig 24 having poor wettability. In this state, the reversal arm 25 was reversed to the position where it could be inserted into the heating chamber 3a (the phantom lines B in the drawing), and the second heat working jig 16 in a state wherein the optical surface 16a turned upward was rapidly sent into the core tube 6, provided in the heating chamber 3a, by the pusher 34. The second heat working jig 16 was repeatedly carried with a pitch of 50 mm by the carrying mass 5 comprising the two fixed rod members and the carrying member 7 in the heating chamber 3a heated at 610° C. in the same way as in the preheating thereof so that the optical glass 14 on the second heat working jig 16 was thermally deformed by heating to form the optical glass preform 18. The optical glass preform 18 was slowly cooled while being carried by the two fixed rod members 8 and the carrying member 7 in the slow cooling chamber 3b. The optical glass preform 18 slowly cooled was recovered by the vacuum suction chuck (not shown) in the recovery chamber 4.

The optical glass preform 18 formed by the above process had the transfer surface 18a formed in the portion which contacted with the optical surface 16a of the second heat working jig 16 and the free surface 18b formed in the position which did not contact with the optical surface 16a of the second heat working jig 16, as shown in FIG. 5. Both the transfer surface 18a and the free surface 18b were otpical mirror surfaces having surface roughness (RMS) of about 20 Å. As a result of optical microscopic observation, no lip such as fine irregularity, foreign matter adhered or scratches was observed in the surface.

Concave shapes having a radius of curvature of 20 mm were formed by using as a base material a hard metal (WC-5TiC-8Co) and then coated with films 30a, 30b of a platinum-iridium-osmium alloy (Pt-Ir-Os) by the sputtering process to form the moulds 20a, 20b, respectively. The optical glass preform 18 was subject to moulding by using the thus-formed moulds 20a, 20b (the apparatus used for moulding is not shown in the drawings). The conditions for moulding were the mould temperature of 550° C., the press pressure 80 Kg/$cm^2$ and the pressing time of 1 minute. The temperature was slowly decreased to 380° C.

The optical glass element 22 formed by the above process had a moulded surface which was an optical mirror surface having surface roughness (RMS) of about 20 Å. No pits such as fine irregularities or scratches were observed in the surface. The surface accuracy was within two Newton rings of power and one fifth ring of irregularity, and the optical performance was extremely excellent.

In the present invention, the conditions such as the composition of optical glass, the materials and shapes of the first heat working jig, the second heat working jig and the pressing moulds, the compositions of the films coated thereon, conditions for thermal deformation (temperature, time and atmosphere), the shape of the optical glass preform and so on are not limited to the above-described embodiments.

What is claimed is:

1. A method of producing an optical glass element, comprising the steps of:
    bringing a gob of optical glass on a first heat working jig into contact with a second heat working jig and making said gob to adhere to said second heat working jig so as to displace said gob from said first heat working jig to second heat working jig while said second heat working jig is turned upside down with said gob contacting its lower surface;
    thermally deforming said gob on said second heat working jig to form an optical glass preform; and
    forming said optical glass preform under heating and pressure by using pressure molds to obtain an optical glass element.

2. A method of producing an optical glass element according to claim 1, wherein sid first heat working jig is made of a material having relatively low wettability with glass at a high temperature.

3. A method of producing an optical glass element according to claim 1, wherein said second heat working jig is made of a material having wettability with glass at a high temperature which is higher than that of said first heat working jig.

4. A method of producing an optical glass element, comprising the steps of:
    receiving a gob of molten glass by a first heat working jig and roughly shaping it, bringing said gob on said first heat working jig into contact with a second heat working jig and making said gob to adhere to said second heat working jig in an oxygen free atmosphere so as to displace said gob from said first heat working jig to said second heat working jig while said second heat working jig is turned upside down with said gob contacting its lower surface;
    thermally deforming said gob on the optical surface of said second heat working jig to form an optical glass preform having a free surface on one side and a transfer surface of said optical surface on the other side; and forming said optical glass preform obtained by thermal deformation under heating and pressure by using pressing molds to obtain an optical glass element.

5. A method of producing an optical glass element according to claim 4, wherein the surface of said first heat working jig, which contacts with molten glass, is made of a material having relatively low wettability with molten glass.

6. A method of producing an optical glass element according to claim 4, wherein said second heat working jig has wettability with high temperature glass which is higher than that of said first heat working jig.

7. A method of producing an optical glass element according to claim 6, wherein at least the optical surfaces of said second heat working jig and said pressing moulds are coated with chemically stable films.

8. A method of producing an optical glass element according to claim 7, wherein said chemically stable films are made of a single metal such as noble metals, tungsten, tantalum, rhenium or hafniumor an alloy thereof.

9. A method of producing an optical glass element comprising the steps of:

receiving a gob of molten glass by a convex or plane first heat working jig and roughly shaping it;

bringing said gob of molten glass on said first heat working jig into contact with a second heat working jig and making said gob of molten glass to adhere thereto so as to displace said gob of molten glass from said first heat working jig to said second heat working jig by reversing said second heat working jig together with said gob of molten glass;

thermally deforming said gob of molten glass on the optical surface of said second heat working jig to form an optical glass preform which has a free surface on one side and a transfer surface of said optical surface of said second heat working jig on the other side; and forming said optical glass preform obtained by thermal deformation under heating and pressure by using pressing moulds to form an optical glass element.

10. A method of producing an optical glass element according to claim 9, wherein the surface of said first heat working jig which contacts with said molten glass is made of a material having relatively low wettability with molten glass.

11. A method of producing an optical glass element according to claim 9, wherein said second heat working jig has wettability with high temperature glass which is higher than that of said first heat working jig.

12. A method of producing an optical glass element according to claim 9, wherein at least the optical surfaces of said second heat working jig and said pressing moulds are coated with chemically stable films.

13. A method of producing an optical glass element according to claim 12, wherein said chemically stably films are made of a single metal such as noble metals, tungsten, tantalum, rhenium or hafnium or an alloy thereof.

* * * * *